(12) United States Patent  (10) Patent No.: US 8,288,690 B2
Boubeddi et al.  (45) Date of Patent: Oct. 16, 2012

(54) OVEN STEAM GENERATOR SYSTEMS AND METHODS

(75) Inventors: Abdelaziz Boubeddi, Hoofddorp (NL); Paul E. Miller, Long Beach, CA (US)

(73) Assignee: Mag Aerospace Industries, Inc., Carson, CA (US)

( * ) Notice: Subject to any disclaimer, the term of this patent is extended or adjusted under 35 U.S.C. 154(b) by 321 days.

(21) Appl. No.: 12/688,483

(22) Filed: Jan. 15, 2010

(65) Prior Publication Data

US 2010/0230396 A1  Sep. 16, 2010

Related U.S. Application Data

(60) Provisional application No. 61/145,123, filed on Jan. 16, 2009, provisional application No. 61/170,350, filed on Apr. 17, 2009, provisional application No. 61/170,372, filed on Apr. 17, 2009.

(51) Int. Cl.
*A21B 1/00* (2006.01)
*B05B 1/24* (2006.01)

(52) U.S. Cl. ........ 219/399; 219/400; 219/401; 219/402; 392/394; 392/397; 392/398; 392/401; 392/402; 126/369; 126/369.1; 126/369.2; 126/348; 99/467; 99/468; 99/473; 99/474

(58) Field of Classification Search .......... 219/400–402, 219/399; 392/394, 397–8, 401–2; 126/369, 126/369.1, 369.2, 348; 99/467–8, 473–4
See application file for complete search history.

(56) References Cited

U.S. PATENT DOCUMENTS

| | | | |
|---|---|---|---|
| 3,639,725 | A | 2/1972 | Maniscalco |
| 3,744,474 | A | 7/1973 | Shaw |
| 4,066,011 | A | 1/1978 | Ballentine |
| 4,173,215 | A | 11/1979 | Bureau et al. |
| 4,430,557 | A | 2/1984 | Eichelberger et al. |
| 4,697,067 | A | 9/1987 | Rosset et al. |
| 4,700,685 | A | 10/1987 | Miller |
| 4,701,334 | A | 10/1987 | Durth |
| 4,722,268 | A | 2/1988 | Rightley |
| 4,835,368 | A | 5/1989 | Fortmann et al. |

(Continued)

FOREIGN PATENT DOCUMENTS

CH 617582 6/1980

(Continued)

OTHER PUBLICATIONS

International Search Report and Written Opinion dated Aug. 5, 2011 in Application No. PCT/US2010/021160.

(Continued)

*Primary Examiner* — Shawntina Fuqua
(74) *Attorney, Agent, or Firm* — Dean W. Russell; Kristin M. Crall; Kilpatrick Townsend & Stockton LLP

(57) ABSTRACT

Embodiments of the present invention relate generally to steam ovens, and particularly to steam ovens configured to generate and deliver steam directly to the oven using a water reservoir in close proximity to an existing oven heat generating system. The steam ovens described may be designed so that they inject steam directly into the oven cavity, and in some instances, generate the steam directly in the oven cavity as well. Certain embodiments are designed with a water reservoir in close proximity to an oven heat generating system such that water in the reservoir is heated, turned to steam, and delivered to the oven cavity via a steam delivery system.

11 Claims, 10 Drawing Sheets

U.S. PATENT DOCUMENTS

| | | | |
|---|---|---|---|
| 4,851,644 A * | 7/1989 | Oslin | 219/400 |
| 4,920,948 A | 5/1990 | Koether et al. | |
| 5,209,941 A | 5/1993 | Wuest | |
| 5,232,010 A | 8/1993 | Rozenblatt | |
| 5,499,577 A | 3/1996 | Tommasini | |
| 6,100,509 A | 8/2000 | Saito | |
| 6,342,262 B1 | 1/2002 | Wuest | |
| 6,914,219 B2 | 7/2005 | Kuhne | |
| 2005/0082271 A1 | 4/2005 | Kuhne | |
| 2005/0158041 A1 | 7/2005 | Hoehne et al. | |
| 2005/0279216 A1 | 12/2005 | Miller | |
| 2006/0060181 A1 | 3/2006 | Sasaki et al. | |
| 2006/0207440 A1 | 9/2006 | Matsuo et al. | |
| 2006/0237182 A1 | 10/2006 | Godecker et al. | |
| 2007/0051246 A1 | 3/2007 | Suzuki | |
| 2007/0110861 A1 | 5/2007 | Hoffjann et al. | |
| 2007/0272675 A1 | 11/2007 | Kuhne | |
| 2008/0258477 A1 | 10/2008 | Wagner et al. | |
| 2010/0200555 A1 | 8/2010 | Godecker et al. | |
| 2010/0224616 A1 | 9/2010 | Yasuhara | |
| 2011/0100477 A1 | 5/2011 | Miller | |

FOREIGN PATENT DOCUMENTS

| | | |
|---|---|---|
| CH | 677582 | 6/1991 |
| DE | 19626955 | 1/1998 |
| DE | 19732240 | 4/1999 |
| EP | 0436703 | 7/1991 |
| EP | 0968676 | 1/2000 |
| EP | 1016832 | 7/2000 |
| EP | 1617148 | 1/2006 |
| EP | 1669676 | 6/2006 |
| EP | 1768529 | 5/2010 |
| WO | WO 91/01 674 | 2/1991 |
| WO | WO 2007/144572 | 12/2007 |
| WO | WO2010083387 | 7/2010 |
| WO | WO2011056763 | 5/2011 |

OTHER PUBLICATIONS

International Search Report and Written Opinion dated Mar. 8, 2011 in Application No. PCT/US2010/055036.

* cited by examiner

OVEN STEAM GENERATOR SYSTEMS AND METHODS

This application claims the benefit of U.S. Provisional Application Ser. No. 61/145,123, filed Jan. 16, 2009 titled "Steam Generation Methods and Apparatus Using Oven Heat," U.S. Provisional Application Ser. No. 61/170,350, filed Apr. 17, 2009 titled "Steam Oven Generator," and U.S. Provisional Application Ser. No. 61/170,372, filed Apr. 17, 2009 titled "Steam Oven Generator Control System," the entire contents of each of which are hereby incorporated by reference.

FIELD OF THE INVENTION

Embodiments of the present invention relate generally to steam ovens, and particularly to steam ovens configured to generate and deliver steam directly to the oven using a water reservoir in close proximity to an existing oven heat generating system. The steam ovens described may be designed so that they inject steam directly into the oven cavity, and in some instances, generate the steam directly in the oven cavity as well. Certain embodiments are designed with a water reservoir in close proximity to an oven heat generating system such that water in the reservoir is heated, turned to steam, and delivered to the oven cavity via a steam delivery system.

BACKGROUND

In many instances, it is useful to provide an oven that cooks or heats food products by using steam. Specific uses of such steam ovens may vary, but one particular use is on board aircraft or other transportation vehicles in order to provide a quick, safe, and convenient method for cooking, heating, or re-heating food products.

Some existing steam ovens generate steam by injecting water directly or indirectly onto heating elements of the oven. In some systems, the water is injected inside a warm oven in a mist form, and when the water mist contacts the heating elements or the fan, the mist vaporizes instantly and becomes steam. Such systems are referred to as injection systems. One downside associated with injection systems is that over time, water calcification can build up on the heating elements and fan elements. A further downside of these systems is that the user needs to wait until the oven reaches a certain temperature before the water can be injected with the desired effects, which may take longer than is often desired.

Additionally, systems using these methods are typically pressurized systems, meaning that pressure must be built up and maintained inside the oven. Pressurized steam oven systems require additional safety precautions, such as tighter seals, more robust door construction, and additional safety features in order to prevent opening of the door while the oven is pressurized. They also tend to be more expensive, heavier, and create more liability during use. For example, when the user is ready to open the door, the pressure in the oven must be completely relieved before the door can be opened; opening the door in the middle of a cooking cycle can be quite dangerous, resulting in scalding the user or others in the vicinity. Additionally, pressurized steam ovens cannot be used if the seals are weakened or damaged or otherwise show signs of wear, adding to maintenance expense.

Other available steam ovens generate steam by dripping water into a recessed tray at the base of the oven. The recessed tray is heated by a second heating element positioned below the tray. Such systems are referred to as drip systems. One downside associated with drip systems is that due to the use of two heaters, they generate more heat loss from the unit, they require more power consumption, and they tend to be heavier than other types of steam ovens. Such systems are typically unpressurized ovens, which means that pressure is not maintained inside the oven. The cooking compartment may be opened at any time during the cooking process in order to check the oven without waiting for depressurization, which is considered by many to be less of a potential hazard than pressurized systems.

In many domestic and industrial steam ovens, separate steam generators are placed outside the cooking chamber. These steam ovens are fitted with a completely separate, external steam generator, which can be located in a separate compartment next to the oven or mounted directly to the inner lining of the oven. The steam from the external steam generator may be injected into the oven when needed, with the steam being heated to the desired temperature. These ovens do not lend themselves to use onboard aircraft or other transport vehicles, due to the extra weight and larger size associated with these types of ovens. They also require a great deal more power consumption due to the use of a separate steam generator system.

Accordingly, particularly when the steam oven is intended for use in a smaller space or in conditions with limited power capacity (such as an aircraft or other transportation vehicles), it is desirable to eliminate the need for using an extra electrical heater or steam generator. Additionally, it has also been found to be desirable to provide an unpressurized steam oven that uses less power, results is lower heat losses, and is more efficient than the currently available steam ovens.

BRIEF SUMMARY

Embodiments of the present invention provide steam ovens that are designed to inject steam directly into the oven cavity, and in some instances, generate the steam directly in the oven cavity as well. Certain embodiments are designed with a water reservoir in close proximity to an oven heat generating system such that water in the reservoir is heated, turned to steam, and delivered to the oven cavity via a steam delivery system.

One embodiment provides an steam oven for use on-board a transportation vehicle, the oven comprising steam generator system comprising: an oven cavity; an oven heat generating system positioned inside the oven cavity and configured to heat the oven cavity; and a water reservoir in fluid communication with a steam delivery system; wherein the water reservoir is positioned in close proximity to the oven heat generating system, such that heat is transferred to water in the water reservoir in order to generate steam in the water reservoir, wherein the steam delivery system delivers steam from the water reservoir directly into the oven cavity.

One method for generating steam in a steam oven on board a transportation vehicle, comprises providing a steam generator system of the type described above, providing water to the water reservoir; providing heat to the oven heat generating system; allowing the oven heat generating system to deliver heat to the water reservoir either directly or indirectly, causing steam to be generated in the water reservoir; and delivering the steam to the oven cavity via the steam delivery system.

DETAILED DESCRIPTION

Embodiments of the present invention provide steam ovens that generate steam by using heat from an existing oven heat generating system (i.e., one that is already a part of the steam oven), which eliminates the use of a separate electrical heater. The generated heat may be used to directly heat water in the water reservoir system, or to indirectly heat water in the water reservoir system. Indirect heating may occur by transfer of heat to an oven liner, which then transfers its heat to a water reservoir mounted thereto, such that the water in the water reservoir is heated and converted to steam using the lost heat from the oven inner liner. A further embodiment uses existing heater elements that are present inside the oven cavity and provides a water reservoir tube that closely conforms to the heater elements, such that heat is transferred to the water reservoir tube, and consequently to the water contained therein, forming steam that is delivered to the oven cavity.

Figure 1:
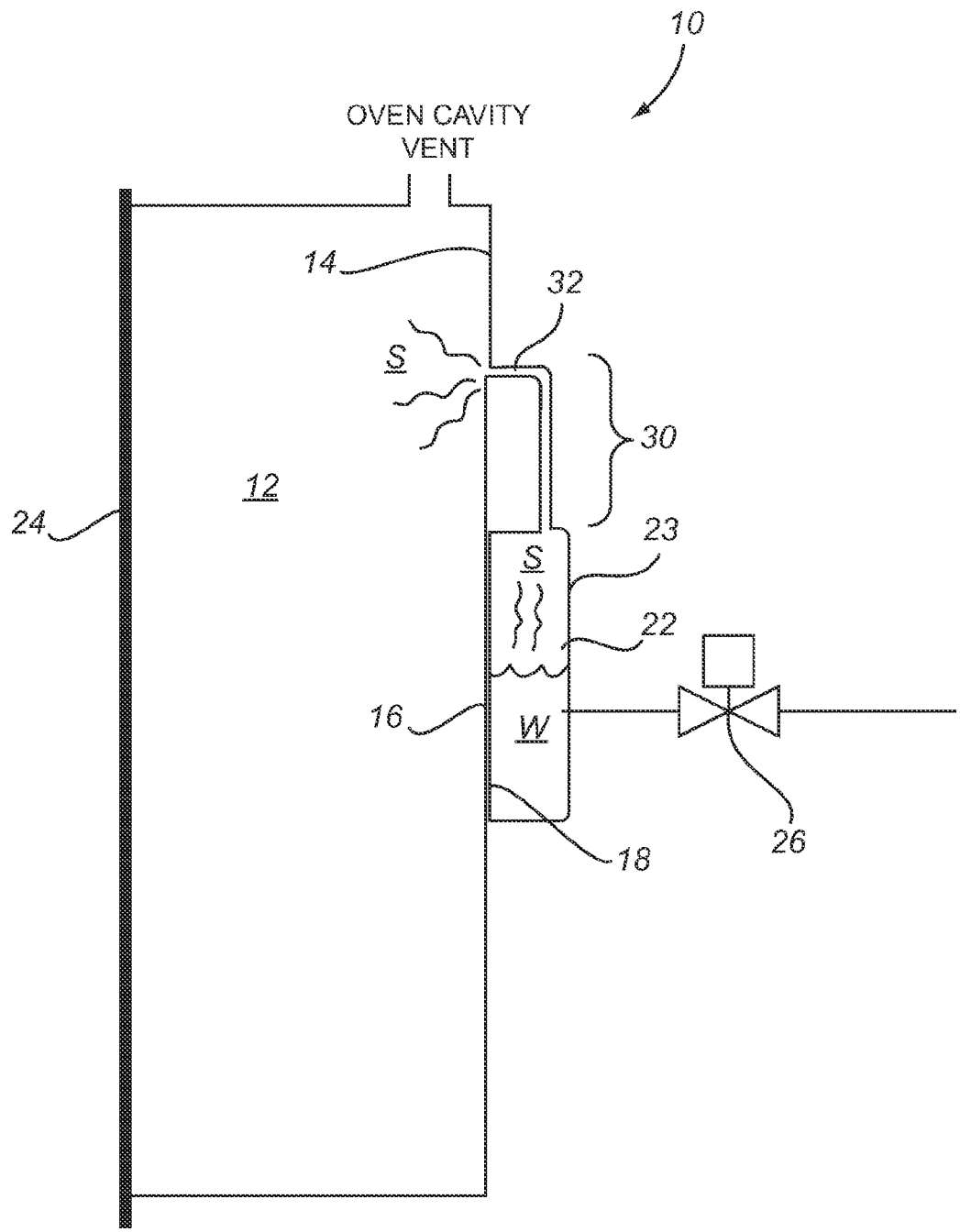
FIG. 1 shows a schematic view of a steam oven according to one embodiment of the invention.

For example, a first embodiment of a steam oven generator system 10 is shown in FIG. 1. This system 10 includes an oven cavity 12 (which may also referred to as a "cooking chamber") with a water reservoir 22 positioned outside the oven cavity 12. Oven cavity 12 is lined with an oven liner 14, and further features an oven heat generating system 20 (as shown in FIGS. 1A, 4A, 5, and 6 for illustrative purposes, but it should be understood that an oven heat generating system is present in all embodiments described herein) positioned inside the oven cavity 12 that generates radiant and/or convective heat inside the cavity 12. Oven cavity 12 also has an oven door 24 to close the cavity 12 and an oven cavity vent. The oven cavity 12 may also feature one or more fans 40 (again, as shown in FIG. 1A, 4A and FIGS. 5-6 but typically present in all steam ovens) that blow and/or circulate air and steam through the oven.

As shown more specifically in FIG. 1, the oven cavity 12 has an oven liner 14 that lines its inner surfaces. The oven liner 14 has an inner, oven-facing side 16 and an outer, rear-facing side 18. The liner 14 is typically a metallic material so that it conducts and transfers heat effectively and easily. One example of a potential liner material includes but is not limited to sheet metal, but it should be understood that any metallic material that can help conduct heat may be used and is considered within the scope of this invention.

Figure 1A:
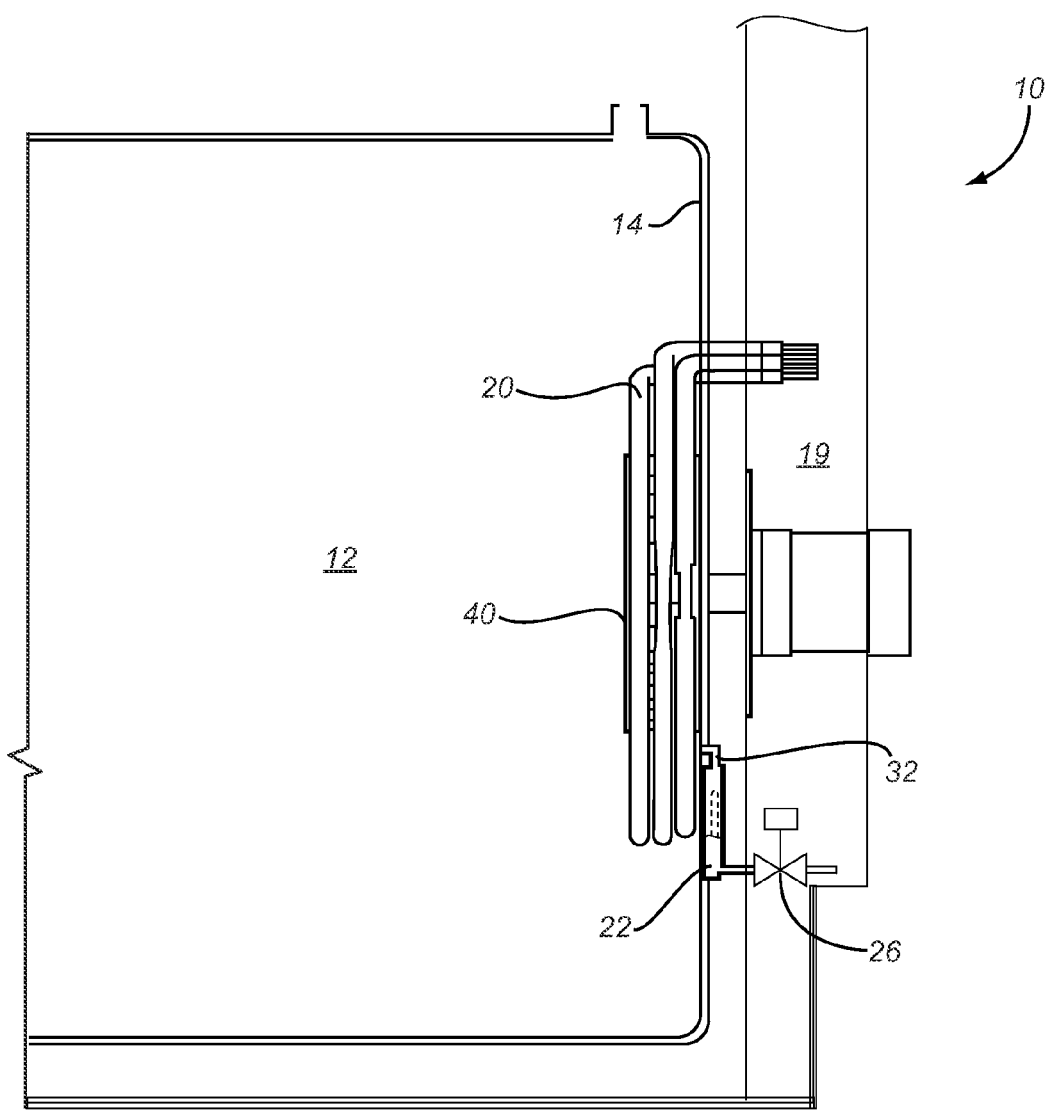
FIG. 1A shows a schematic side view of the stem oven of FIG. 1, including the oven heat generating system, the fan, and the insulation.
Figure 4:
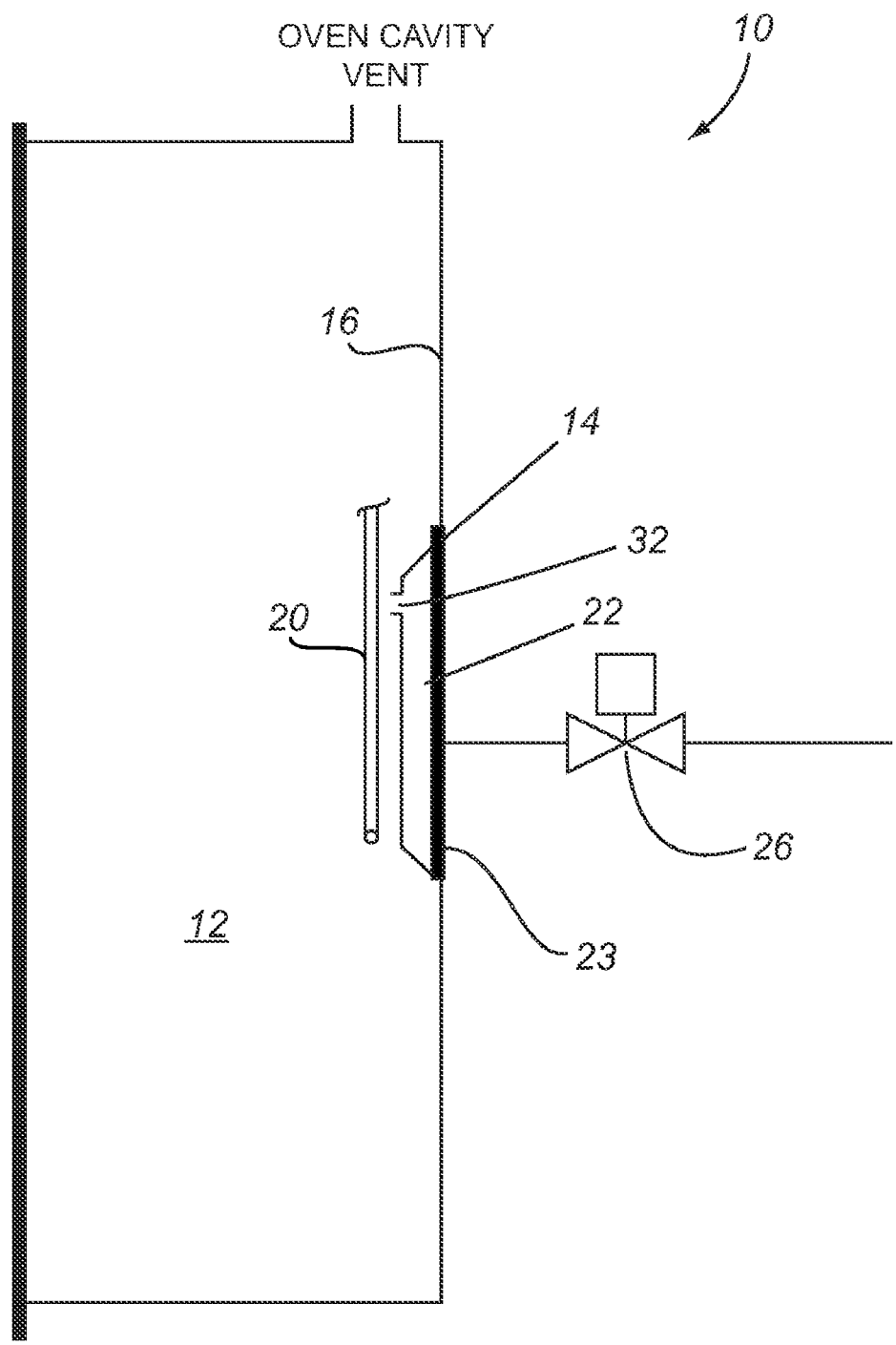
FIG. 4 shows a schematic view of a steam oven according to a further embodiment of the invention.
Figure 4A:
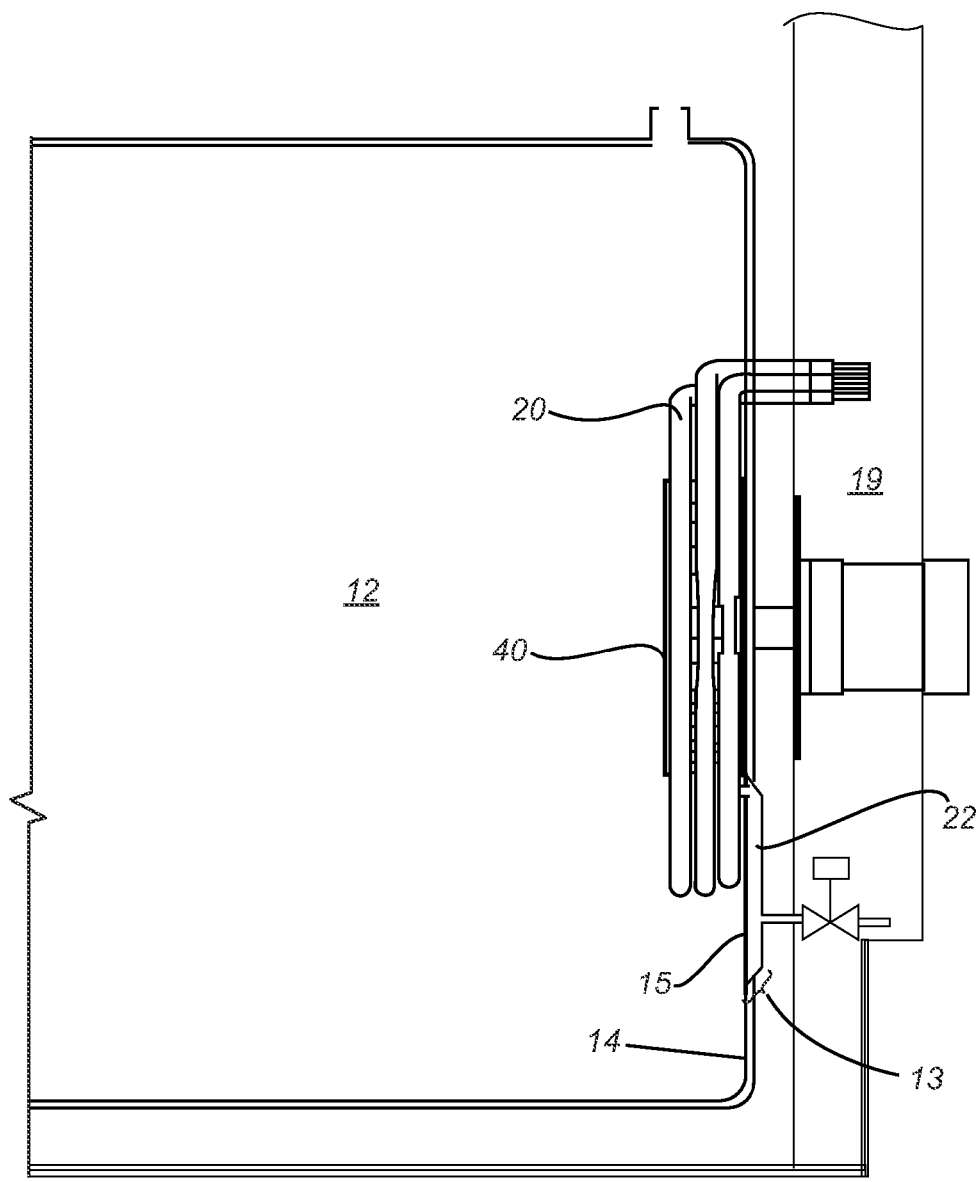
FIG. 4A shows an alternate embodiment of a steam oven of FIG. 4 with a recessed liner and metallic plate forming the water reservoir.

As shown in FIGS. 1A and 4A, an insulating layer 19 is also provided along and covering the entire outer surface of the oven, along all surfaces other than the oven door 24, in order to prevent a user from being burned by the heat that is generated by the oven heat generating system 20 and transferred to the oven liner 14 in use.

FIG. 1 shows the water reservoir 22 mounted directly against the rear-facing side 18 of the oven liner 14. The water reservoir 22 is also typically a metallic material. Due to the high temperatures inside the oven cavity 12 (typically greater than about 100° C.) that are created by the oven heat generating system 20, heat is transferred through the metallic oven liner 14 to the metallic water reservoir 22. The high temperature of the water reservoir 22 walls 23 is then transferred to water W held within the reservoir 22, which converts the water W to steam S. In short, the heat from the oven liner 14 (that would otherwise be lost) is transferred to the water reservoir 22 in order to generate steam S. In another embodiment, at least one wall of the water reservoir 22 (e.g., the wall closest to the oven) is formed by the outer, rear-facing side of the oven liner. This embodiment helps capture even more heat because the shared wall prevents heat from having to cross two surfaces, but instead, needs to only cross one surface—the shared wall.

The steam S that is generated in the water reservoir 22 rises from the water level W in the water reservoir 22 and enters a steam delivery system 30, which in FIG. 1, is shown as a steam vent 32. Steam vent 32 is configured in a pipe-like fashion. It has one end that extends from and is in fluid communication with the water reservoir 22 and another end that connects to and is in fluid communication with the oven cavity 12, such that it delivers steam S from the water reservoir 22 to the oven cavity 12. Steam vent 32 is shown as having a curved portion, although this is not required and any configuration of a vent, opening or conduit that can communicate with both the water reservoir 22 and the oven cavity 12 is considered within the scope of this invention. For example, there may be provided simply a communication hole between an upper area of the water 22 reservoir and the oven cavity 12 that acts as the steam delivery system 30. The steam may escape from the water reservoir 22 and enter the oven cavity through such a hole, instead of through a vent or pipe.

Figure 2:
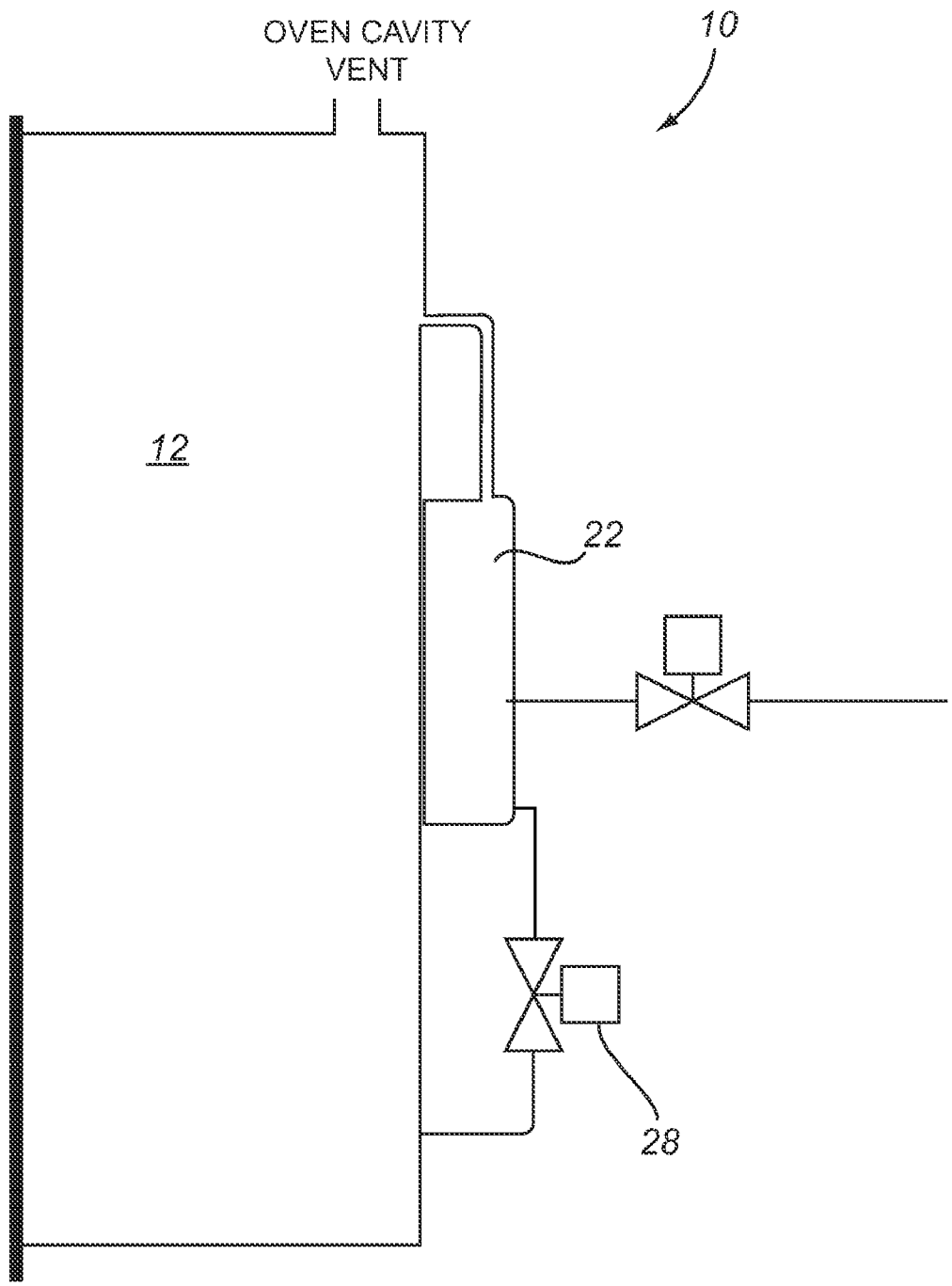
FIG. 2 shows a version of the steam oven of FIG. 1, having a water reservoir drain valve.

The steam may be produced in a continuous or discontinuous process by controlling the water supply by using a normally closed valve. FIG. 1 shows a water reservoir fill valve 26, which connects to a water source on the aircraft, vehicle, or other water source location where the oven is to be used. Fill valve 26 may be opened to add water to reservoir 22 when desired. FIG. 2 shows a system 10 that is very similar to that shown and described with respect to FIG. 1, but includes a water reservoir drain valve 28, which can be used when the water reservoir 22 needs to be drained. Additionally, the drain valve 28 may also drain residual water into or away from the inner oven, if any is present after the cooking cycle is finished.

Figure 3:
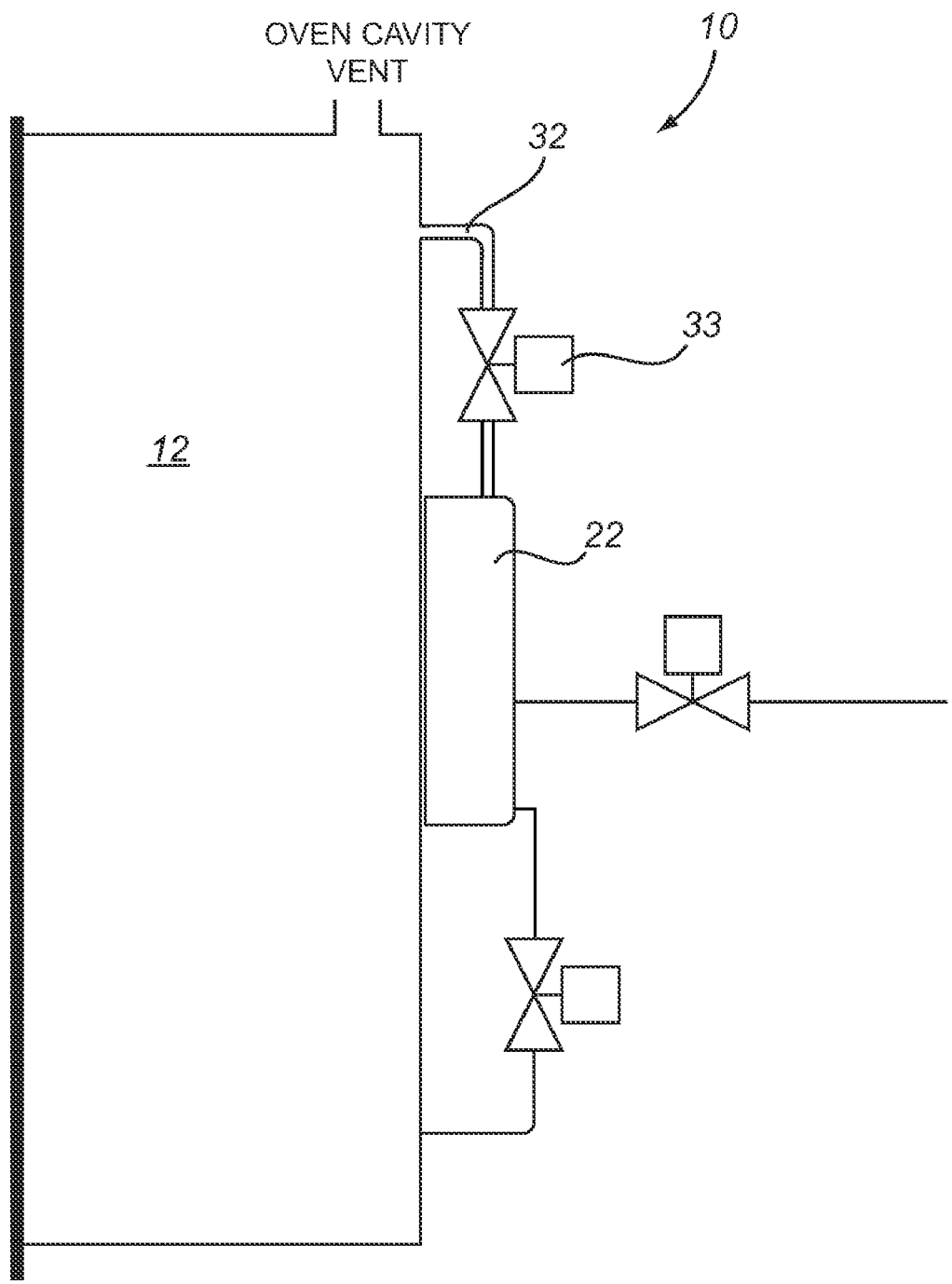
FIG. 3 shows a version of the steam oven of FIG. 2, having a water reservoir steam vent valve.

FIG. 3 also shows a system 10 that is very similar to that shown and described with respect to FIGS. 1 and 2, but includes a steam vent valve 33 associated with the steam vent 32, which may useful if it is desired to allow steam to build up in the reservoir and/or block the steam from entering the oven cavity 12. Steam vent valve 33 is generally open, but is used to control the amount of steam needed in the oven.

The system shown in FIGS. 1-3 may be referred to as a passive system, because the steam is created outside the oven cavity 12 and vented into the oven cavity 12. Although this system works more quickly than many other steam oven options available on the market, it may still take up to five minutes before the steam is delivered to the oven cavity. In some instances, this is acceptable, but in other instances, steam generation is desired even more quickly. Accordingly, some of the other embodiments described further below (for example, as shown in FIGS. 4-8) may be considered as more active systems, because they provide steam generation and delivery systems that are positioned entirely inside the oven cavity and deliver steam directly to the oven cavity even more quickly.

For example, as shown in FIGS. 4 and 4A, providing water reservoir 22 inside the oven cavity 12 may help generate steam even more quickly. The water reservoir 22 may be a separate container that is mounted to the inner, oven-facing side 16 of the oven liner 14. Alternatively, it may share a wall with the oven-facing side 16, such that the water reservoir 22 is integrated into the oven liner 14. Integrating the water reservoir 22 partly into the inner liner 14 may help to reduce the reaction time required to generate steam. This is partly because such a design helps reduce the amount of material that has to be heated in order for steam generation to occur.

FIG. 4 shows the water reservoir 22 integrated partly into or formed as a part of the inner liner 14, such that part of the wall of the inner liner 14 (the inner, oven-facing 16 portion) forms a wall or at least a portion of a wall of the water reservoir 22. Specifically, a portion of the inner, oven-facing side 16 may form the back wall 23 of the water reservoir 22. The reservoir may still be filled by a fill valve 26, but in this embodiment, the water injected into the water reservoir 22 enters the actual oven cavity 12 itself and is in direct contact with the oven inner liner wall 14. The steam vent 32 is also located within the oven cavity 12, with the steam vent 32 extending out from the reservoir 22, such that steam is delivered directly into the oven cavity 22 from the water reservoir 22. It should also be understood, however, that water reservoir 22 need not share a wall with the oven liner, but may instead be a separate container secured to the inside of the oven cavity on or near the oven liner.

In the specific embodiment shown in FIG. 4A, there may be provided a recess 13 in the inner liner 14 that is covered by a metallic plate 15 in order to create a cavity that forms the water reservoir 22. Recessing the water reservoir cavity into the oven cavity reduces the clearance between the heating elements 20 and the water reservoir 22, which is always beneficial in a small space, such as on an aircraft or other transportation vehicle.

Figure 5:
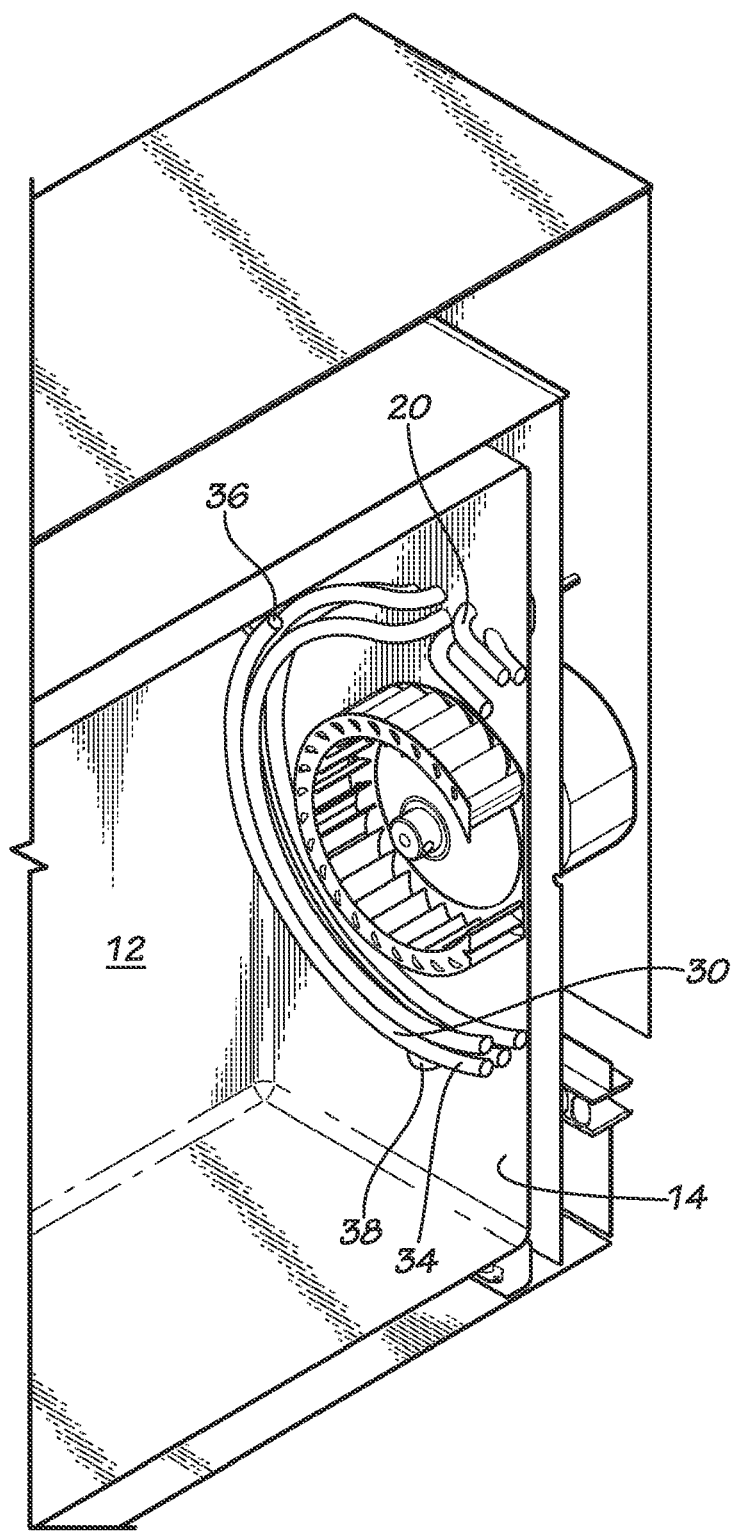
FIG. 5 shows a side perspective view of a steam oven according to an even further embodiment of the invention.
Figure 6:
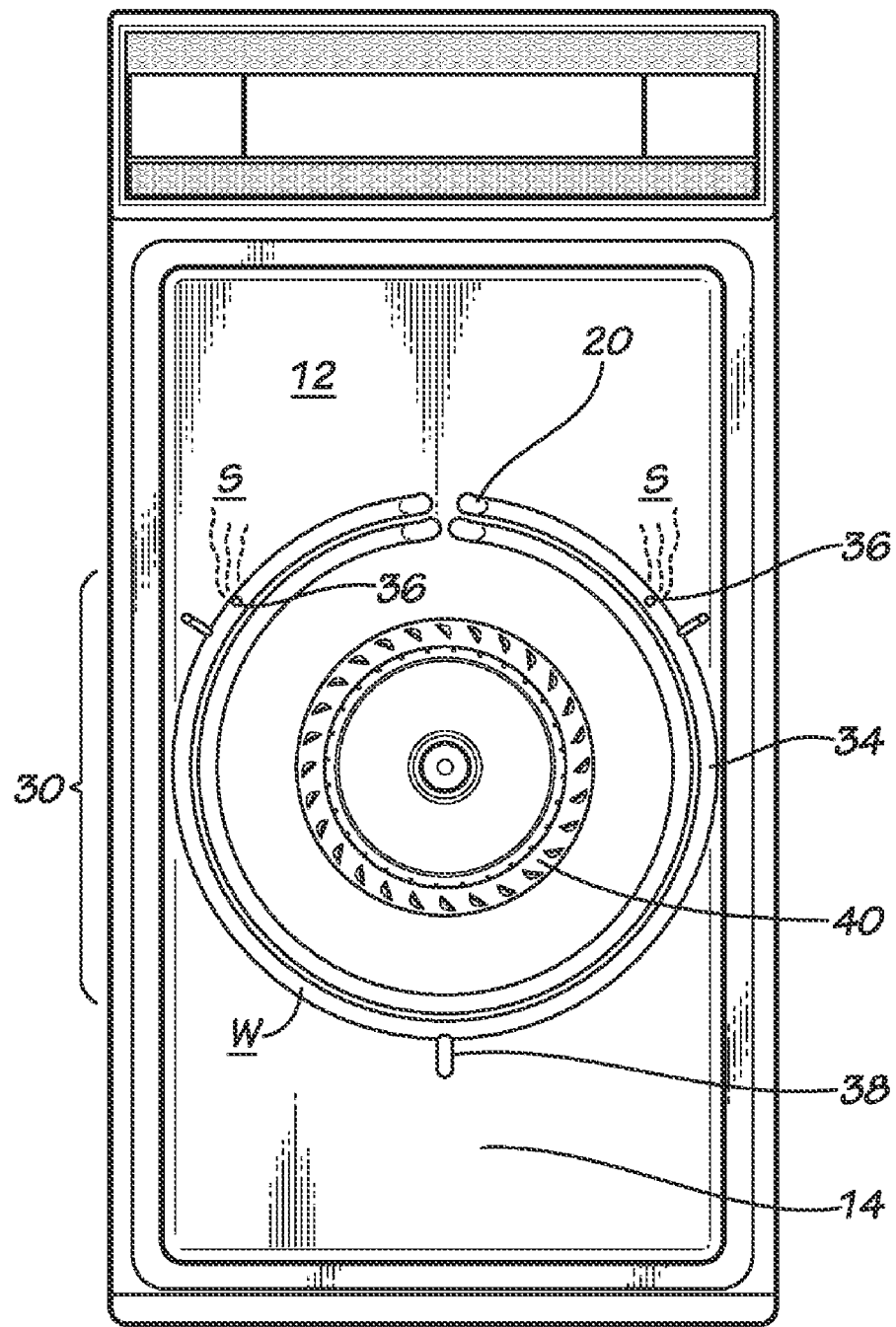
FIG. 6 shows a side plan view of the inside of the oven of FIG. 5.

A further embodiment of a steam oven is illustrated in FIGS. 5 and 6, which show a water reservoir in the form of a water reservoir tube 34 positioned inside and in close proximity to the oven heat generating system 20, which is shown as a series of one or more heater elements 20 positioned inside the cooking chamber or oven cavity 12. In a specific embodiment, the tube 34 is mounted directly to one or more of the heater elements 20 at the rear of the inner oven liner 14 of the oven cavity for steam generation.

In a further embodiment, the water reservoir tube 34 is configured to conform to the approximate shape of the one or more heater elements 20. For example, FIGS. 5 and 6 show heater elements 20 as curved, and accordingly, water reservoir tube 34 is similarly curved, and follows the contour(s) of the heater elements 20. It should be understood, however, that any appropriate shape may be used for heater elements 20 and water reservoir tube 34, for example, rectangular shaped, Y-shaped, L-shaped, U-shaped, or any other appropriate shape that will generate and transfer heat.

As such, water reservoir tube 34 may be any shape or configuration, but one embodiment that has been found particularly useful is a tube 34 having an upwardly curved shape (e.g., a C-shape or a U-shape) with open ends. In the embodiment shown, the steam delivery system comprises open ends of the tube 34 that form open steam outlets 36. As shown in FIG. 6, when water inside the tube 34 is heated (due to the close proximity or actual contact of the tube 34 with the one or more heater elements 20), it eventually converts to steam S within the tube 34.

At some point along the tube's curvature (e.g., shown along the bottom of the curvature portion in FIG. 6), there is a water inlet 38, which cooperates with a water source. Although not shown in these figures, the water inlet 38 may also be associated with one or more fill or drain valves that are configured to control the amount of water delivered to or removed from the water reservoir tube 34.

Water reservoir tube 34 is typically made of a metallic material, similar to the types described above. The general intent is to provide a tube that can quickly transfer heat to the water contained therein. As discussed above, in one embodiment, tube 34 is mounted either directly against one or more heat generating elements 20 (which are mounted to inner liner 14), such that tube 34 directly touches or contacts at least a portion of one or more of the elements 20 or is in close proximity thereto. Direct mounting can help encourage rapid and efficient heat transfer from the element(s) 20 to tube 34. Alternatively, tube 34 may be mounted in close proximity to the one or more heat generating elements 20, such that it does not directly contact the element(s) 20, but is close enough that heat from the elements(s) 20 is still transferred to the tube 34. In other words, there may be a space between the element(s) 20 and the tube 34.

In use, a desired amount water from a water reservoir is delivered to the water reservoir tube 34 (for example, through water inlet 38). Water may be delivered to tube 34 is small amounts during the cooking cycle, or the entire amount of water needed to generate steam for the entire oven cooking cycle may be delivered at once. (Potential control, circuitry and flow systems that may be used in connection with these embodiments are described further below.) The high temperature of the one or more heater elements 20 inside the oven is then transferred to the water reservoir tube 34. This causes the water reservoir tube 34 to heat up, transferring heat to the water W contained within the tube, causing the water to transform into steam S. The steam may be produced in continuous or discontinuous process by controlling water supply by using one or more normally closed valves. The steam S the exits the water reservoir tube 34 through the steam delivery system, i.e., the open ends of the tube which function as steam outlets 36.

Because this system causes direct or more active transfer of heat directly inside the oven, the oven may only need to be heated for about two minutes before steam is generated. This is beneficial because steam is created and delivered directly in the oven cavity 12, rather than being pumped in from an external source or generated from a water mist or water droplets injected into the oven. Water is not injected into the oven; water is not provided in a drip pan at the bottom oven; water is present only in the tube 34, and its first presentation into the oven cavity 12 itself is as steam S exiting from open steam outlets 36 of the water reservoir tube 34, as shown in FIG. 6. Fan 40 is provided to help distribute steam S throughout the oven cavity 12. If any mineral build-up or calcification occurs in this system 30, it will occur inside the tube 34, which can easily be removed and cleaned or replaced entirely.

Figure 7:
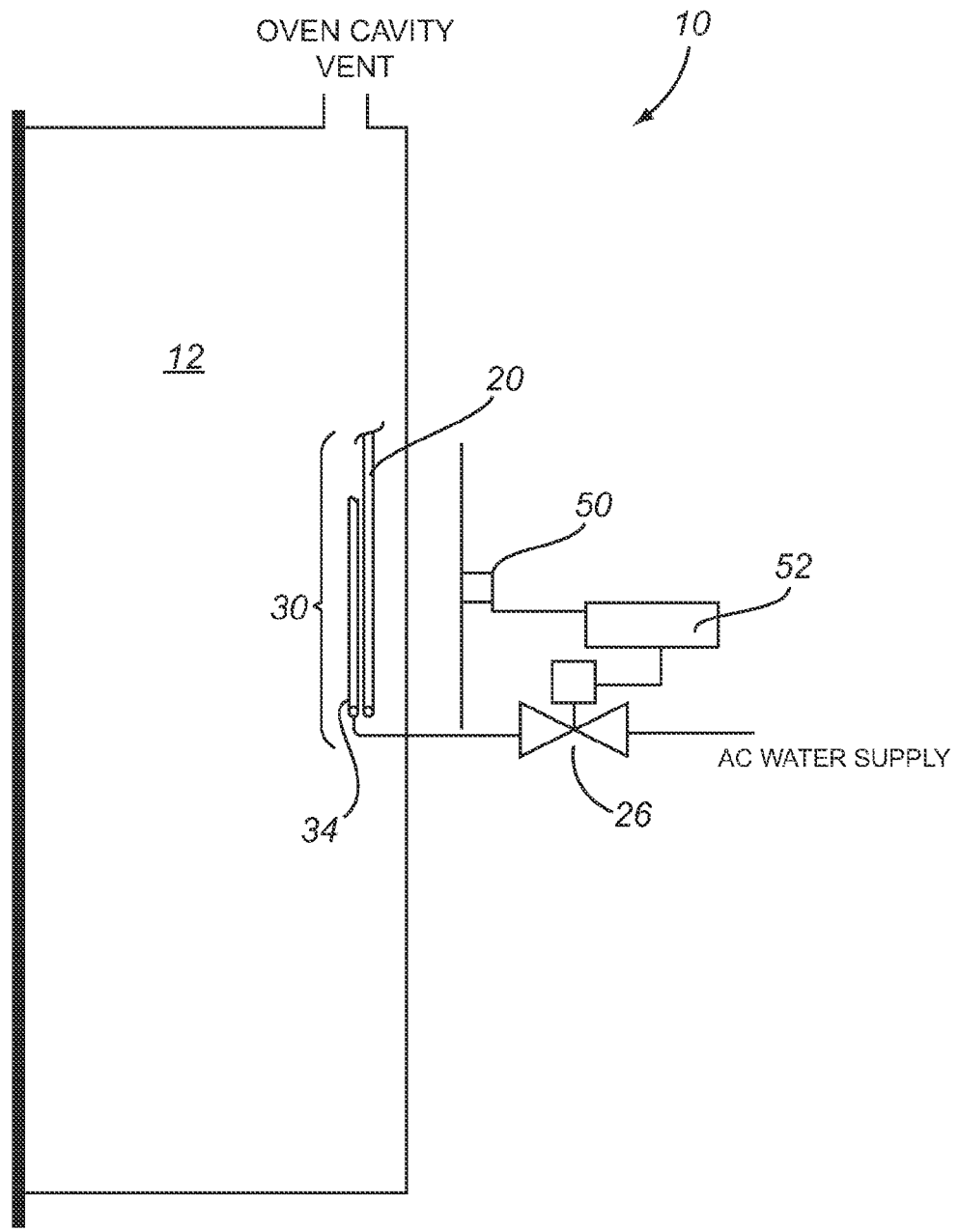
FIG. 7 shows a side schematic view of the steam oven of FIGS. 5 and 6, with a water reservoir level sensor.
Figure 8:
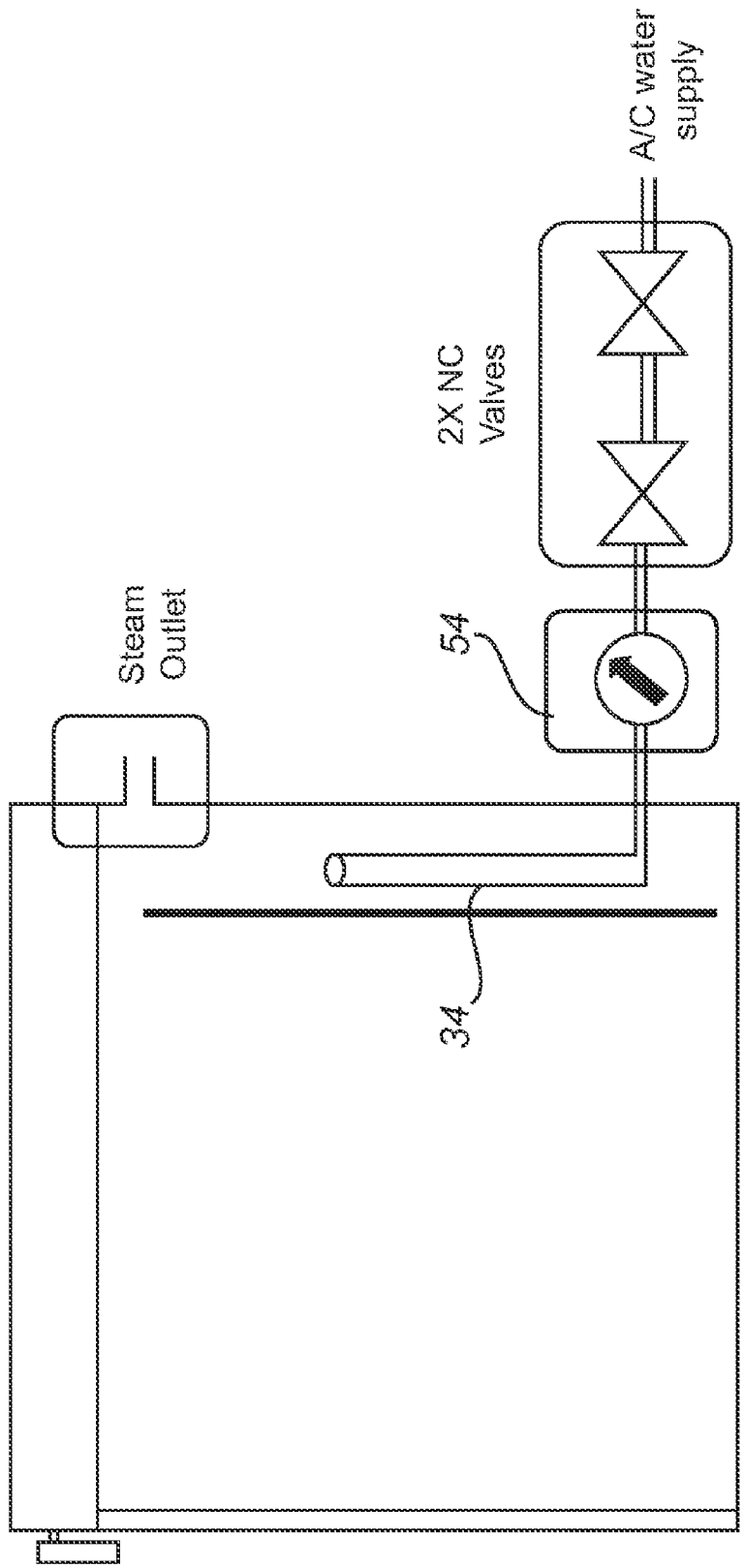
FIG. 8 shows a side schematic view of the steam oven of FIGS. 5 and 6, with a flow meter.

FIGS. 7 and 8 show various embodiments for water level sensing and flow control for the above-described steam generation and delivery system 30. Although these control systems are shown and described in the context of steam generation inside the oven cavity (and specifically, the embodiments of FIGS. 5 and 6), it should be understood that the control system described may be used for any of the systems described herein, including steam generation that is conducted in the water reservoir positioned outside the oven cavity.

FIG. 7 shows a side schematic view of a steam generator inside an oven having a water level sensor 50 and water level control circuitry 52. The sensor 50 and control circuitry 52 work together to meter (or deliver) a specified or controlled amount of water into the steam generation and delivery system 30 at a certain specified or predetermined rate or setting. The system is then designed to monitor (or allow the user to monitor) how much water remains in the system 30. The control of water provided into the steam generation and delivery system 30 allows improved performance of the system because the water (that is provided to generate the steam that is actually introduced into the oven) is controlled at a predetermined rate or level. One advantage of this design is that the level sensor 50 can sense and inform the user about the amount of water in the system before the start of the cooking cycle. In other words, the sensor 50 provide useful feedback even when the oven is not heating because it senses the presence of water, not steam (which is not generated until the oven is in use). By contrast, other sensor systems on the market are designed to only measure the presence of steam in the oven once the oven cooking cycle has begun and the oven is heating, which requires the oven to be on, operating, and generating steam before any sensing can take place. By providing the water presence information prior to the cooking cycle, the invention improves the efficiency of catering activities.

Control circuitry 52 controls whether and how much water is present and being delivered through system water lines. For example, when a solenoid valve is opened, water may be delivered into the system 30. If water does not contact the sensor 50 (i.e., if the water level is low or down), then the circuitry 52 informs the oven that there is no water available or being delivered to system 30, which may be displayed on the front of the oven for user notification.

In some ovens, a cooking cycle may be set to last ten minutes or twenty minutes or any other predetermined time unit. The oven is then set or programmed to deliver a defined amount of water so that the cooking cycle will last the predetermined cooking time. In one specific embodiment, the water per cooking time may be set to be 200 mL/24 minutes or any proportion thereof for a shorter cycle. These ratios may be pre-set prior to oven delivery and installation or they may be modifiable by the end user if desired.

The water may be set to pulse a certain amount per minute or every few minutes, which may be controlled by a flow meter 54, as shown in FIG. 8. There may also be a series of back-up provisions programmed into the system so that if the water is not pulsing into the system 30 as quickly as it should (or faster than it should), the safety back up will either shut the oven off or override the flow meter to deliver more water to system 30.

It may also be possible to provide a mechanism that relies solely on valve timing to deliver the water into the reservoir. Such a mechanism need not use a level sensor or a flow meter, but may only use control circuitry. For example, it may be a metered timing device (or an automatic metering system) that delivers water to the water reservoir at a certain rate. The design and features of such control circuitry would be apparent to one of ordinary skill in the art, and are thus not described further here.

Changes and modifications, additions and deletions may be made to the structures and methods recited above and shown in the drawings without departing from the scope or spirit of the invention and the following claims.

What is claimed is:

1. A steam oven for use on-board a transportation vehicle, the oven comprising steam generator system comprising:
    an oven cavity;
    an oven heat generating system positioned inside the oven cavity and configured to heat the oven cavity, wherein the oven heat generating system comprises a series of one or more heater elements inside the oven cavity;
    a water reservoir in fluid communication with a steam delivery system, wherein the water reservoir comprises a water reservoir tube positioned inside the oven cavity in close proximity to the oven heat generating system and configured to conform to the approximate shape of the series of one or more heater elements, such that heat is transferred to water in the water reservoir tube in order to generate steam in the water reservoir,
    wherein the steam delivery system comprises at least one open steam outlet at the end of the water reservoir tube or anywhere along the water reservoir tube,
    such that heat is transferred to water in the water reservoir tube in order to form steam inside the tube, and wherein the steam exits the tube at the at least one open steam outlet of the tube and is delivered directly into the oven cavity.

2. The steam oven of claim 1, wherein the one or more heater elements are curved, and wherein the water reservoir tube is similarly curved.

3. The steam oven of claim 1, wherein the water reservoir tube is mounted on or otherwise in direct contact with the one or more heater elements.

4. The steam oven of claim 1, wherein the water reservoir tube comprises a water inlet in order to deliver water to the water reservoir tube.

5. The steam oven of claim 1, further comprising a fill valve associated with the water reservoir.

6. The steam oven of claim 1, further comprising a drain valve associated with one or both of the water reservoir and the oven cavity.

7. The steam oven of claim 1, further comprising a fan associated with the oven cavity.

8. The steam oven of claim 1, further comprising a water reservoir level sensor, control circuitry, a flow meter, or any combination thereof.

9. The steam oven of claim 1, wherein the transportation vehicle is an aircraft.

10. An aircraft comprising the steam oven of claim 1.

11. A method for generating steam in a steam oven on board a transportation vehicle, comprising
    (a) providing a steam generator system comprising:
        an oven cavity;
        an oven heat generating system positioned inside the oven cavity and configured to heat the oven cavity, wherein the oven heat generating system comprises a series of one or more heater elements inside the oven cavity; and
        a water reservoir in fluid communication with a steam delivery system, wherein the water reservoir comprises a water reservoir tube positioned inside the oven cavity in close proximity to the oven heat generating system and configured to conform to the approximate shape of the series of one or more heater elements, such that heat is transferred to water in the water reservoir in order to generate steam in the water reservoir,
        wherein the steam delivery system delivers steam from the water reservoir directly into the oven cavity;
    (b) providing water to the water reservoir;

(c) providing heat to the oven heat generating system;
(d) allowing the oven heat generating system to deliver heat to the water reservoir either directly or indirectly, causing steam to be generated in the water reservoir; and
(e) delivering the steam to the oven cavity via the steam delivery system.

* * * * *